United States Patent
Kabir et al.

(10) Patent No.: US 6,826,755 B1
(45) Date of Patent: Nov. 30, 2004

(54) SYSTEMS AND METHODS FOR SWITCHING INTERNET CONTEXTS WITHOUT PROCESS SHUTDOWN

(75) Inventors: Ahsan Syed Kabir, Redmond, WA (US); Erik Snapper, Kirkland, WA (US); Darren Mitchell, Woodinville, WA (US); Rajeev Dujari, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 646 days.

(21) Appl. No.: 09/608,397

(22) Filed: Jun. 30, 2000

(51) Int. Cl.$^7$ .......................... G06F 9/46; G06F 15/177
(52) U.S. Cl. ...................... 718/108; 718/100; 718/102; 718/107; 709/221
(58) Field of Search ................................ 709/100, 102, 709/104, 107, 108, 200, 201, 203, 213, 217–219, 227–229; 718/100, 102, 104, 107, 108

(56) References Cited

U.S. PATENT DOCUMENTS

| | | | | |
|---|---|---|---|---|
| 5,764,908 A | * | 6/1998 | Shoji et al. | 709/217 |
| 5,790,790 A | * | 8/1998 | Smith et al. | 709/206 |
| 5,835,724 A | * | 11/1998 | Smith | 709/227 |
| 5,845,267 A | * | 12/1998 | Ronen | 705/40 |
| 5,881,230 A | * | 3/1999 | Christensen et al. | 709/203 |
| 6,085,220 A | * | 7/2000 | Courts et al. | 709/201 |
| 6,199,113 B1 | * | 3/2001 | Alegre et al. | 709/229 |
| 6,219,042 B1 | * | 4/2001 | Anderson et al. | 345/716 |
| 6,327,584 B1 | * | 12/2001 | Xian et al. | 707/1 |
| 6,397,217 B1 | * | 5/2002 | Melbin | 707/10 |
| 6,460,084 B1 | * | 10/2002 | Van Horne et al. | 709/227 |
| 6,466,570 B1 | * | 10/2002 | Low et al. | 370/352 |

\* cited by examiner

*Primary Examiner*—Meng-Al T. An
*Assistant Examiner*—Syed J Ali
(74) *Attorney, Agent, or Firm*—Lee & Hayes, PLLC

(57) ABSTRACT

Systems and methods for switching from a first Internet context to a second Internet context without process shutdown are described. Internet context data, such as cookies, history and user-defined data, is stored in containers unique to each user on a system. Internet content is stored in a common location so redundant downloaded information is not stored. Content information is found or stored by hashing a URL and indexing the memory location according to the resulting hash value. If content data is specific to a particular user, a hash is performed on a combination of the URL and an ordinal associated with the user's unique identity to obtain a hash value unique to the user. The user-specific content is then stored and the memory location is indexed according to the unique hash value.

8 Claims, 6 Drawing Sheets

SYSTEMS AND METHODS FOR SWITCHING INTERNET CONTEXTS WITHOUT PROCESS SHUTDOWN

TECHNICAL FIELD

This invention relates to managing network connections and, more particularly, to switching Internet contexts without requiring process shutdown.

BACKGROUND

When a user browses the Internet using a browser on a computer, the user builds up an Internet context for her browsing activity, e.g., through cookies, history and personalized data. As the popularity of Internet browsing has grown, it is not uncommon to have more than one person using a single computer. When different people use the same computer for Internet browsing, Internet contexts can become confused. As a result, one user may no longer know which websites he has visited, and users' preferences for the same website may conflict.

To accommodate multi-user arrangements, operating systems support "profiles" for different users, each profile defining a particular work environment configured for a particular user. Each user of a computer can maintain his or her own profile, which accommodates the particular user. However, switching from one Internet context to another requires a system-wide process shutdown, meaning that a current user must end any tasks that are in progress and log off before a new user can log in. In addition, most families do not go to the trouble to enable profiles on their home computers and, therefore, they cannot switch contexts at all.

SUMMARY

The implementations described herein allow web browsers and other Internet client applications to provide separate contexts for different users, or identities without requiring a process shutdown. This is accomplished by creating an Internet context management component that can select new directory locations for storing non-content state and by tagging content to indicate whether or not the data is personalized to a specific user.

In one implementation, an Internet management object maintains a set of objects called containers, one for each class of Internet state. Each container is located in its own directory on the file system of a computer. This set of containers is called a cache. The information in these containers forms an Internet context that is associated with an identity, each computer user having a unique identity.

When a client wants to change Internet contexts, it supplies a globally unique identifier (guid) that denotes a specific identity to the Internet management object. This initiates the process by which the Internet management object will switch Internet contexts.

The Internet management object shuts down the cache for a current user to prevent any operations from utilizing the cache any further. To simplify naming directories and content tagging, the Internet management object associates each guid with an ordinal according to one described implementation. The Internet management object attempts to create and use a set of containers associated with the new guid using this ordinal. If this is unsuccessful, the Internet management object will restart the cache and continue to use the current Internet context. Otherwise, the Internet management object flushes any authentication credentials, purges session cookies and resets the session start time. In other words, the Internet browser or client application will behave as if it has been closed and restarted.

As the Internet context is built with the new identity, cookies, history and other non-content for the new context are placed in a directory associated with the ordinal that maps to the identity's guid. However, content cache is handled differently.

To avoid duplicating Internet content across multiple directories (and thus using large amounts of disk space) content is shared across all identities. But there are cases in which an item is meant for only one identity and there are cases wherein the same universal resource locator (URL) will map to different content for different identities. For example, if a web page is a secure page that only some users can access, or if a page uses cookies, etc.

When content is shared, it is stored in a common directory that is used by each identity. This directory contains an index file that has multiple records indicating the location and other information for one or more web pages. When information from a web page is stored, the URL for the web page is hashed and the hash value is used to look up an index record. The index record reveals information regarding this web page data, including a file name where the information is stored.

When content is user-specific, information indicating that the content is not to be shared is provided to the Internet management object. When the Internet management object detects that this indication has been provided, it performs the look up by hashing a combination of the URL and the ordinal associated with the appropriate identity. This locates a unique user-specific index record similar to that used for shared-content, except that the information is specific for the user, which only the proper identity can access the private information stored therein.

BRIEF DESCRIPTION OF THE DRAWINGS

A more complete understanding of exemplary methods and arrangements of the present invention may be had by reference to the following detailed description when taken in conjunction with the accompanying drawings wherein.

DETAILED DESCRIPTION

Figure 1:
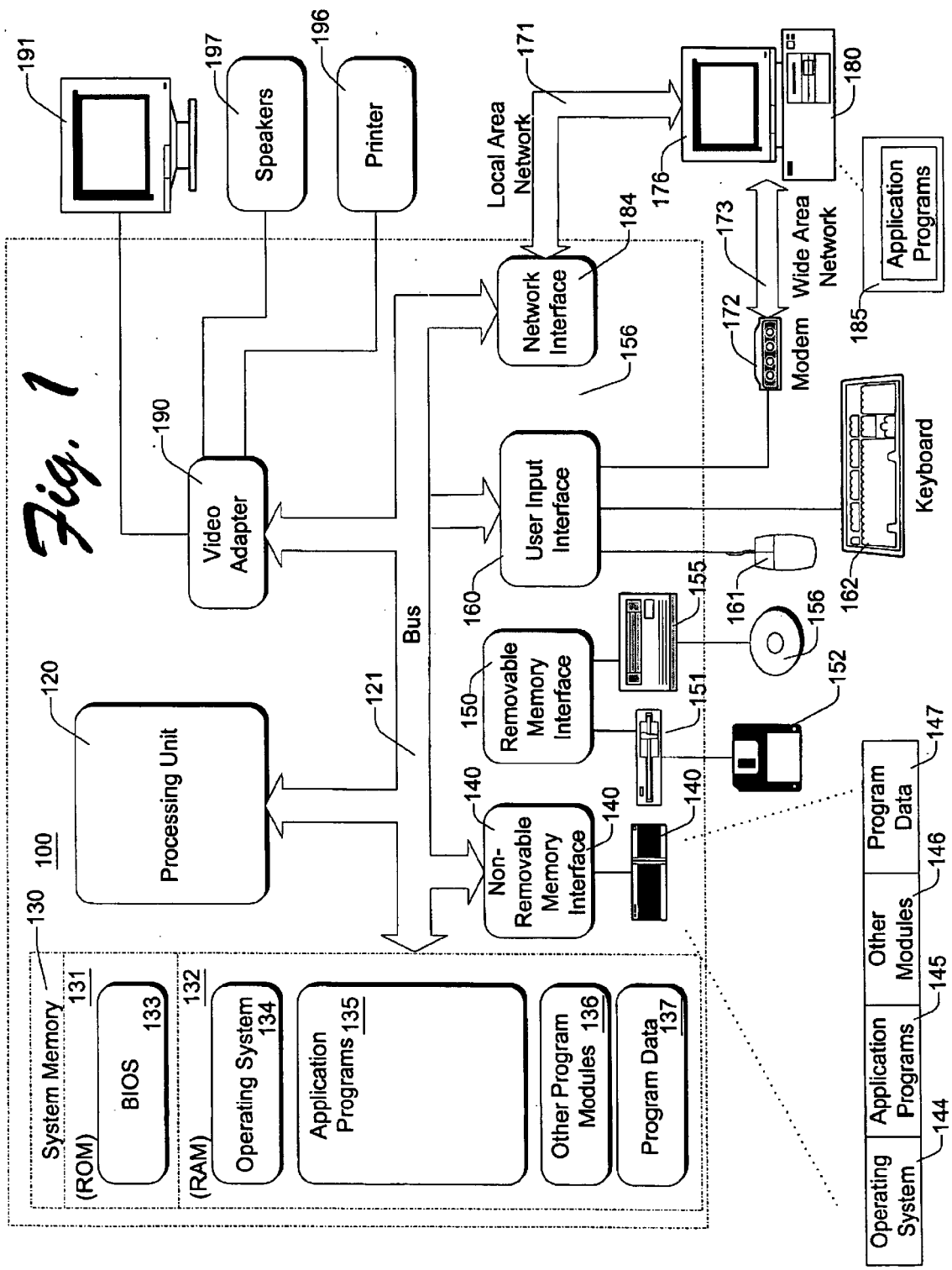
FIG. 1 is a diagram of an exemplary computer system on which the described embodiments may be implemented.

The invention is illustrated in the drawings as being implemented in a suitable computing environment. Although not required, the invention will be described in the general context of computer-executable instructions, such as program modules, to be executed by a computing device, such as a personal computer or a hand-held computer or electronic device. Generally, program modules include routines, programs, objects, components, data structures, etc. that perform particular tasks or implement particular abstract data types. Moreover, those skilled in the art will appreciate that the invention may be practiced with other computer system configurations, including multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Exemplary Computer Environment

The various components and functionality described herein are implemented with a number of individual computers. FIG. 1 shows components of typical example of such a computer, referred by to reference numeral 100. The components shown in FIG. 1 are only examples, and are not intended to suggest any limitation as to the scope of the functionality of the invention; the invention is not necessarily dependent on the features shown in FIG. 1.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 1, the components of computer 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 100 typically includes a variety of computer-readable media. Computer-readable media can be any available media that can be accessed by computer 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 100 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface such as interface 150.

The drives and their associated computer storage media discussed above and illustrated in FIG. 1 provide storage of computer-readable instructions, data structures, program modules, and other data for computer 100. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 100 through input devices such as a keyboard 162 and pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer may operate in a networked environment using logical connections to one or more remote computers, such as a remote computer 180. The remote computer 180 may be a personal computer, a server, a router, a network PC, a peer device or other common network node, and typically includes many or all of the elements described above relative to computer 100, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 100, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
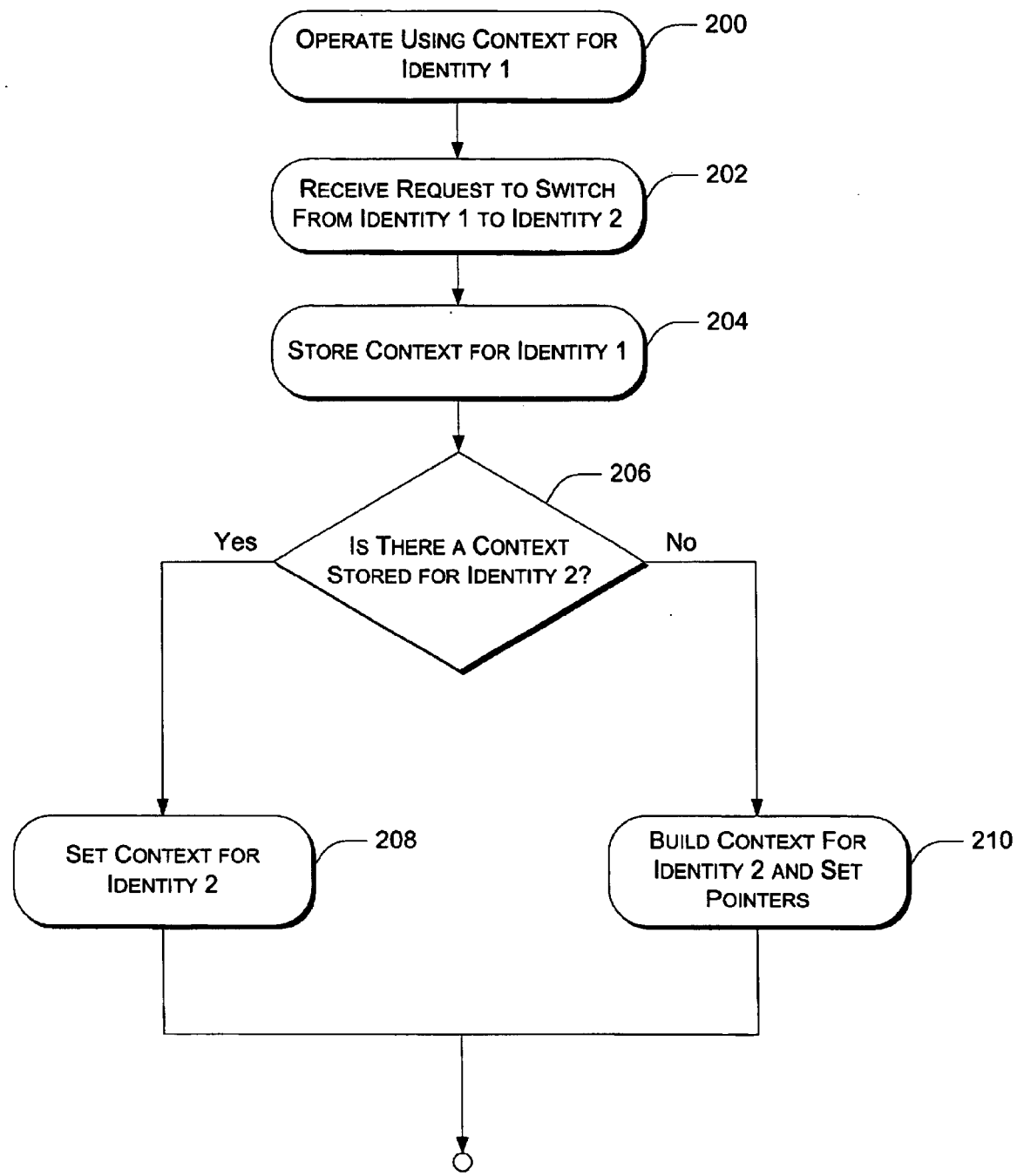
FIG. 2 is a flow diagram of a method according to a general implementation in which an Internet context is changed from an Internet context for a first identity to an Internet context for a second identity.

FIG. 2 is a flow diagram of a method according to a general implementation in which an Internet context is changed from an Internet context for a first identity to an Internet context for a second identity. At step 200, a client computer operates within a context for a first identity. An Internet context comprises data associated with a particular user, or identity. Such data includes a history of web sites that a particular user has visited, cookies that have been placed on the computer by a particular user that allows a web site to gather information about that user, web page content, etc.

At step 202, a request is received to switch from the first identity to a second identity. The request is received by an Internet management object operating on the client computer. The Internet management object is responsible for maintaining an Internet connection and managing the data associated therewith. Although described herein as an Internet management object, an object may be more generally described as a network management object, which performs similar task on networks other than the Internet, such as an intranet, a local area network, a wide area network, etc.

The Internet context for the first identity is stored at step 204. This information is stored in one or more memory locations that are uniquely associated with the first identity. Determining and naming these memory locations is discussed in greater detail below.

If there is an Internet context stored for the second identity ("YES" branch, step 206), then pointers are set to the memory locations containing the context for the second identity (step 208) and the browsing continues using the second identity. If no Internet context is stored for the second identity ("NO" branch, step 206), then a context is built for the second identity and the pointers are set to the memory locations containing this new context, and the browsing continues using the second identity. The steps outlined in FIG. 2 will be discussed in greater detail below.

Figure 3:
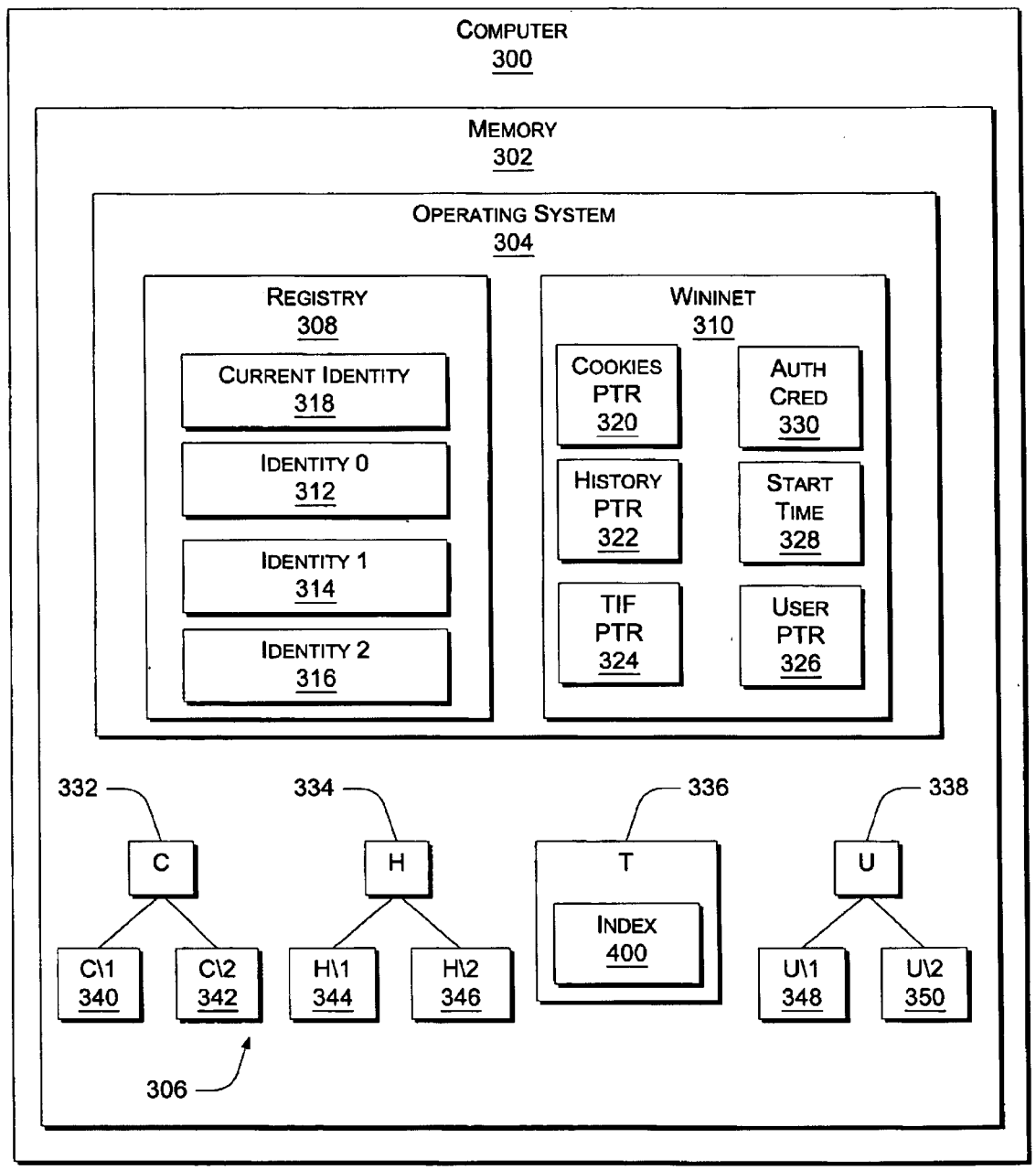
FIG. 3 is a block diagram of a computer having memory storage.

FIG. 3 is a block diagram of a computer 300 having a memory 302. The memory 302 includes an operating system 304 and a hierarchical directory structure 306 for storing Internet context data. The operating system 304 includes a registry 308 and an Internet management object, designated as Wininet 310. Wininet 310 is an Internet management component found in some of the WINDOWS family of operating systems produced by MICROSOFT CORP. It is noted that, although the Internet management object described herein is the specific example of Wininet, this designation is for discussion purposes only. Any other Internet management object that performs the described functions may be implemented.

The registry 308 is a global database that includes multiple profiles of configuration data as well as a pointer that points to a profile currently in use. The registry 308 includes identity 0 312, identity 1 314, identity 2 316 and a current identity 318. The current identity 318 contains a pointer to one of the identities 312–316 that is the current identity. Each identity includes an identity name, an optional identity password, and an identity identifier. The identity identifier is stored as a globally unique identifier (guid) in accordance with a conventional identification scheme in which only one name is associated with a particular object. Each identity also typically includes other work-environment information that can be used by identity-aware applications.

Wininet 310 contains pointers to containers that make up an Internet context. Wininet 310 includes a cookies pointer 320, a history pointer 322, a TIF (temporary Internet files) pointer 324, and a user-defined pointer 326. It is noted that there may be more than one user-defined container and pointer thereto. However, for discussion purposes, only one user-defined pointer is shown herein.

Wininet 310 also includes parameters associated with Internet browsing, such as a session start time 328 and authentication credentials 330. It is noted that these parameters are exemplary only and there may be other or additional parameters, depending on the implementation.

The Wininet pointers reference memory locations in the hierarchical directory structure 306. The cookies pointer 320 references a cookies directory 332; the history pointer 322 references a history directory 334; the TIF pointer 324 references a TIF directory 336; and the user-defined pointer 326 references a user-defined directory 338. It is noted that the cookies directory 332, the history directory 334, the TIF directory 336 and the user-defined directory 338 are subdirectories of at least one superior directory in the directory hierarchy. However, superior directories in the structure are not shown for convenience purposes.

The cookies directory 332, the history directory 334 and the TIF directory 336 are default containers that are associated with identity 0 312. To distinguish Internet context for one identity from Internet context for another identity, subdirectories are created that are associated with each directory referenced by Wininet 310 (except for the TIF directory 336, which will be explained in greater detail below).

The cookies directory 332 has two subdirectories, cookies\1 340 and cookies\2 342. Directory cookies\1 340 is associated with identity 1 314, and directory cookies\2 342 is associated with identity 2 316. The history directory 334 has two subdirectories, history\1 344 and history\2 346. The user-defined directory 338 has two subdirectories, user\1 348 and user\2 350. Each subdirectory is uniquely associated with an identity. It is noted that each directory 332–338 may have virtually any number of subdirectories, according to the number of identities on the system. However, for discussion purposes, the number of identities and, thus, the number of subdirectories is limited herein to two.

Wininet 310 receives requests to switch identities, e.g., to switch Internet contexts from identity 1 314 to identity 2 316. Each request includes a guid, or identifier, associated with identity 2 316. If the request includes an invalid guid, no switch occurs and the browsing continues with the current identity.

More particularly, Wininet 310 receives an InternetSetOption which includes the guid for identity 2 316 and a setting called INTERNET_OPTION_IDENTITY. The Internet context for identity 1 314 (except for content) is stored in containers associated with the guid for identity 1 314. Cookies associated with identity 1 314 are stored in the directory structure 306 in directory cookies\1 340, which is associated with identity 1 314. Historical data associated with identity 1 314 is stored in the directory history\1 342. User-defined context data for identity 1 314 is stored in directory user\1 348. Data associated with identity 1 314 is flushed. This includes authentication credentials 330 for identity 1 314, session cookies, and the like. At this point, the session start time 328 is reset to zero for the new identity.

The discussion so far relates only to non-content context. Management of Internet content will be described in greater detail below.

Figure 4:
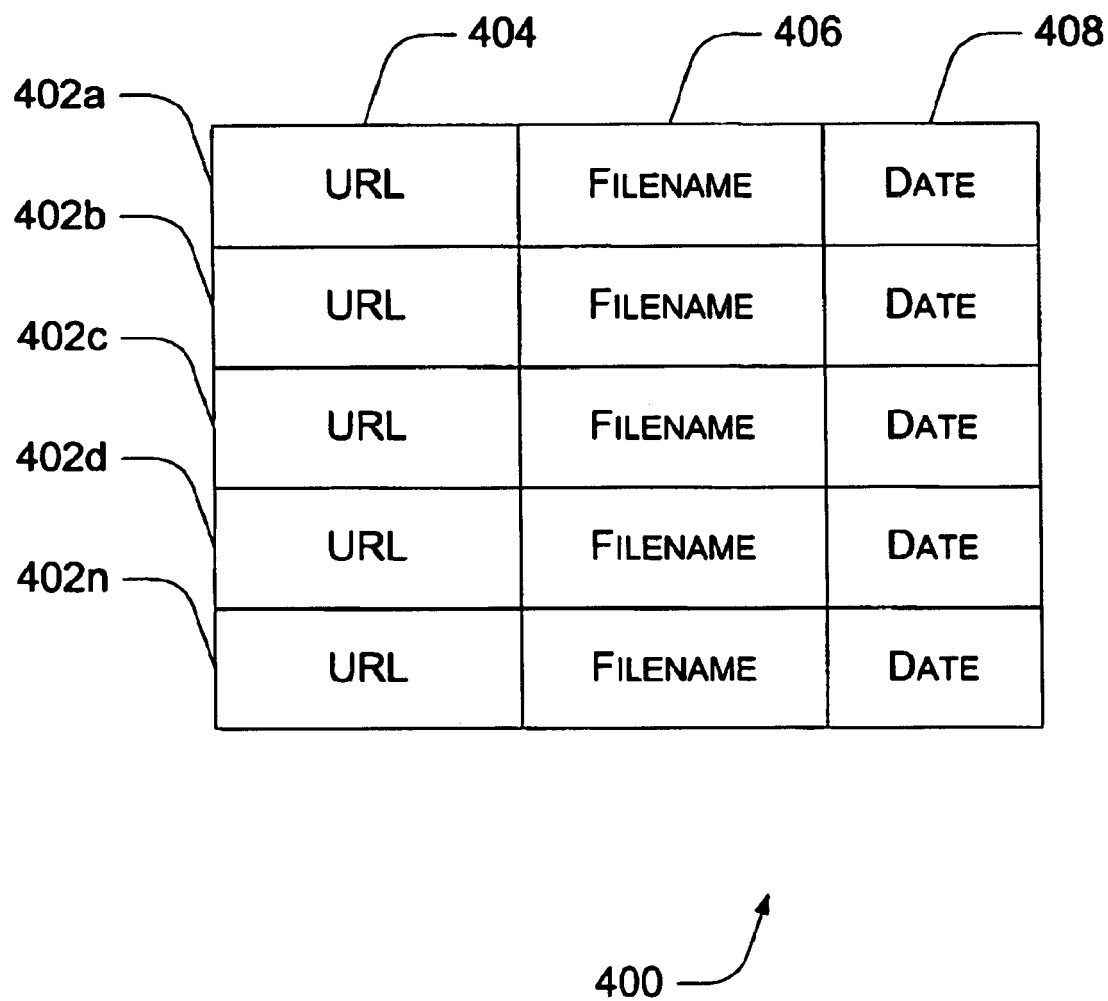
FIG. 4 is a depiction of an index file having multiple records.

The TIF directory 336 contains an index file 400. The index file 400 is shown in greater detail in FIG. 4. The index file 400 includes one or more records 402a–402n. The records 402 are similar in structure, and will be referred to in the singular as record 402. Record 402 includes several members, or fields. As shown for discussion purposes, record 402 contains a URL field 404, a file name field 406, and a date field 408. Other fields or members may be included depending on the implementation. The features of the index file 400 will be discussed in greater detail, below, in discussion of the operation of one or more described implementations.

Figure 5:
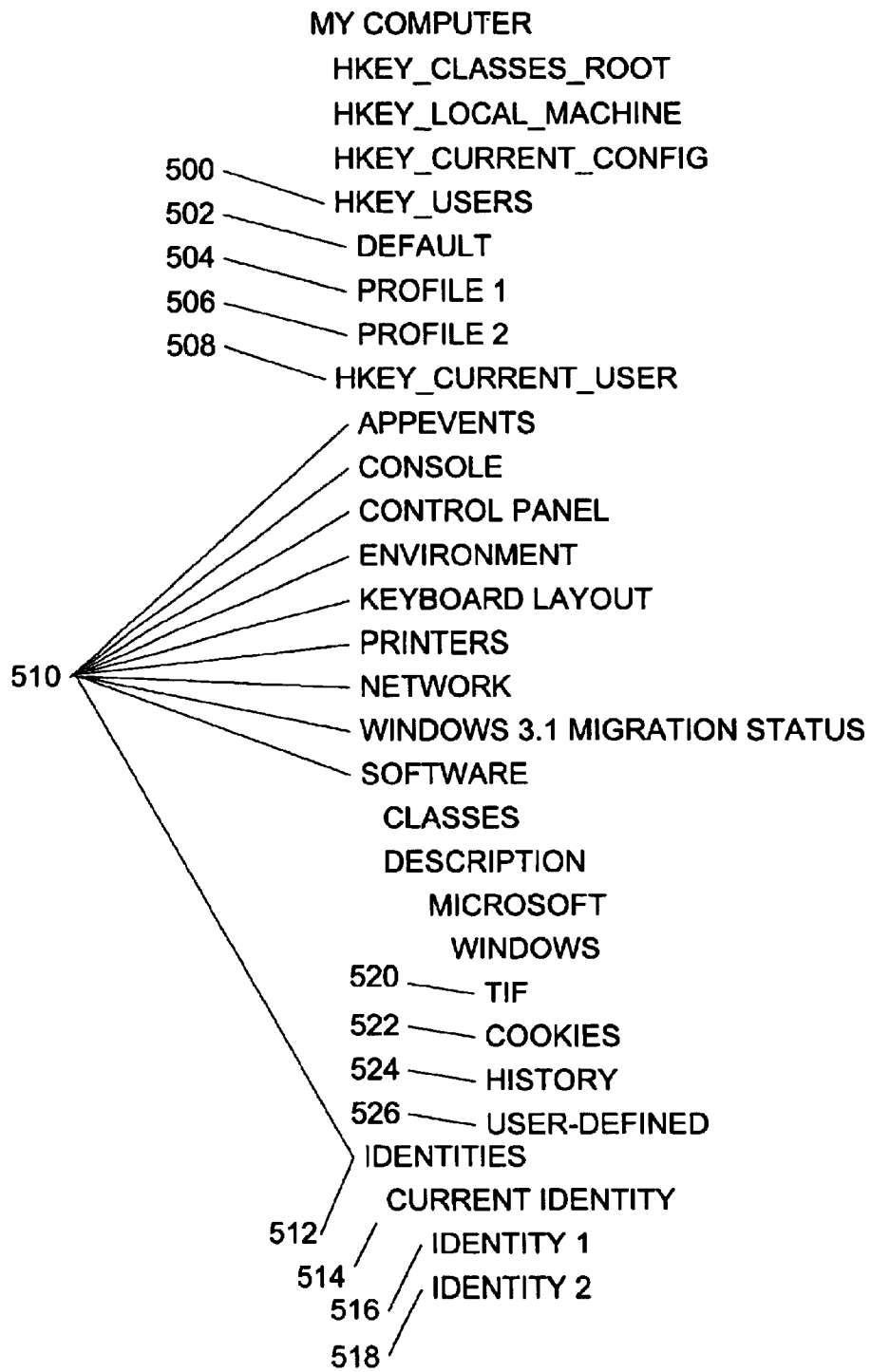
FIG. 5 is a simplified diagram of a registry in the system of FIG. 3.

FIG. 5 is a simplified diagram of one implementation of a registry 308. Registry 308 is a hierarchical database of user and system information. A basic unit of information in the registry is called a "key." Within each "key" there are smaller units of information called "subkeys." One of the keys, key 500 (the HKEY_USERS key) contains all the user profiles. The subkey DEFAULT 502 is the subkey for a default profile. In this example, the subkey PROFILE 1 504 is the subkey for a first profile and the subkey PROFILE 2 506 is the subkey for the second profile. Registry 306 also has another key, key 508 (the HKEY_CURRENT_USER key), the value of which points to the one of the HKEY_USERS subkeys (profiles) that is currently in use. HKEY_CURRENT_USER 508 contains numerous subkeys 510, one of which is the IDENTITIES subkey 512. The IDENTITIES subkey 512 contains a CURRENT_IDENTITY 514 and an individual subkey 516 and 518 for each configured identity. In this example, IDENTITY 1 is identity 1 314 in FIG. 3 and IDENTITY 2 is identity 2 316 in FIG. 3. CURRENT_IDENTITY 514 is a value that points to the one of these two identities 516, 518 that is currently in use. If no identity is selected for use, then the system is in a "non-identity state" and CURRENT-IDENTITY subkey 514 points to no identity.

There is also a TIF subkey 520, a COOKIES subkey 522, a HISTORY subkey 524 and a USER-DEFINED subkey 526. The TIF subkey 520 contains a value that points to a location of Internet content, or temporary internet files, for the CURRENT_IDENTITY 514. The COOKIES subkey 522 contains a value that points to a location of cookies for the CURRENT_IDENTITY 514. The HISTORY subkey 524 contains a value that points to a location of history data for the CURRENT_IDENTITY 514. The USER-DEFINED subkey 526 contains a value that points to a location of user-defined data for the CURRENT_IDENTITY 514. It is noted that there may be more than one USER-DEFINED subkey, or there may be no USER-DEFINED subkey depending on the implementation. For the present discussion, only one USER-DEFINED subkey is shown.

When a switch request is submitted, it is determined if the identity is a new identity or if it has been used before. If the identity has not been used before, then the registry subkey values for COOKIES 522, HISTORY 524 and USER-DEFINED 526 are set to new values and an Internet context begins to be built for the new user. An ordinal x is generated for the guid, and the new value for COOKIES 522 is directory cookies\x 332; the new value for HISTORY 524 is directory history\x 334; and the new value for USER-DEFINED 526 is directory user-defined\x 338.

If the identity has been used before, then the registry subkey values for COOKIES 522, HISTORY 524 and USER-DEFINED 526 are set to values previously stored for the identity. If, for example, a request is submitted to switch to identity 2 316 and identity 2 316 has been used before, subkey COOKIES 522 is set to reference directory cookies\2 342; subkey HISTORY 524 is set to reference directory history\2 346; and subkey USER-DEFINED 526 is set to reference directory user-defined\2 350.

Figure 6:
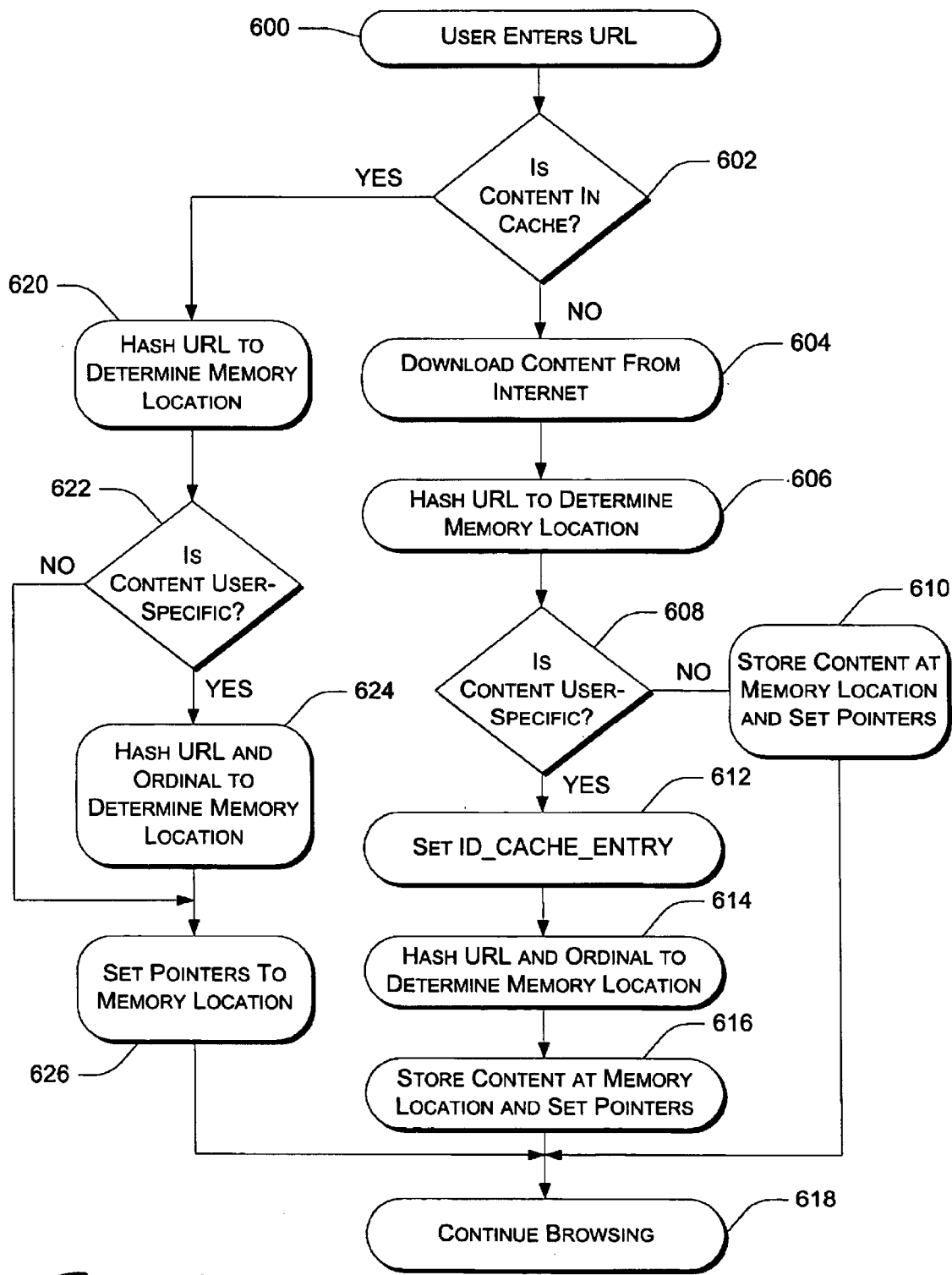
FIG. 6 is a flow diagram illustrating a method for handling shared and user-specific Internet content.

FIG. 6 is a flow diagram outlining management of shared and user-specific Internet content. At step 600, a user enters a universal resource locator (URL) as the user is browsing the Internet. A determination is made at step 602 as to whether Internet content that the user desires to download is stored in the cache. If the content is not in the cache ("NO" branch, step 602), then the content is downloaded from the Internet at step 604.

The URL of the content is hashed at step 606 to determine an index entry that indicates the memory location in which the content will be stored. In memory, a URL is stored as a series of bytes. A hash transformation is applied to the value of the first letter in the URL and the value is stored. The value of the next letter is hashed and the result is combined with the stored hash value. This process repeats until the entire URL has been hashed to result in a URL hash value. This hash value is used to lookup an index location (record) in the index 400 in directory TIF 336.

The content is determined to be shared or user-specific at step 608. If the content is shared, i.e., not user-specific ("NO" branch, step 608), then the content is stored, the memory location is entered into the index at the entry determined by the hash, and the pointers are set to the memory locations (step 610). The user then continues browsing at step 618.

If the content is user-specific ("YES" branch, step 608), then ID_CACHE_ENTRY of the index record determined by the hash is set at step 612. This indicates that the Internet content associated with this record is user-specific. At step 614, a combination of the URL and the ordinal associated with the current identity is hashed to determine an index entry that indicates where the user-specific content will be stored. At step 616, the content is stored, the memory location is entered into the index at the entry determined by the hash, and the pointers are set to the memory locations.

If the Internet content is already stored in the cache ("YES" branch, step 602, then the URL of the content is hashed at step 620 to determine an index entry that indicates the memory location in which the content can be found. The ID_CACHE_ENTRY field of the index record identified by the hash is checked at step 622 to determine if the content is shared or user-specific. If the content is shared, i.e., not user-specific ("NO" branch, step 622), then the pointers are set to the memory location indicated by the index entry located using the hash (step 626) and the browsing continues at step 618.

If the content is user-specific ("YES" branch, step 622), then a combination of the URL and the ordinal associated with the current identity is hashed at step 624 to determine an index entry that indicates the memory location of the user-specific content. The pointers are then set to this memory location and the browsing continues at step 618.

CONCLUSION

Utilizing the described implementations for managing Internet context, switching Internet contexts can be accomplished without a current user having to first log off and a second user log on. To a user, it simply appears as if the browser has been restarted to begin a new session without having terminated the browser. Internet data that is specific to particular users is managed so that the browser can better identify an Internet context with a particular identity, or user.

What is claimed is:

1. An Internet management object stored on a computer-readable medium, comprising computer-executable instructions that, when executed on a computer, perform the following steps:

receiving a request to switch from a first Internet context associated with a first user identity to a second Internet context associated with a second user identity;

storing the first Internet context in one or more containers associated with the first user identity;

setting one or more global pointers to reference the second Internet context located in one or more containers associated with the second user identity without requiring open processes associated with the first user identity to shut down;

determining if the second user identity has been utilized previously; and if the second user identity has not been utilized previously, creating a new Internet context and setting one or more global pointers to reference the new Internet context stored in new containers and associating the new Internet context with the second user identity.

2. The Internet management object as recited in claim 1, wherein the first Internet context includes first Internet content stored in a memory location and identified in an index record, the index record being identified according to a hash value of a URL associated with the first Internet content.

3. The Internet management object as recited in claim 2, when the first Internet content is shared content.

4. The Internet management object as recited in claim 1, wherein the first Internet context includes first Internet content stored in a memory location and identified in an index record, the index record being identified according to a hash value of a URL associated with the first Internet content and a value uniquely associated with the first user identity.

5. The Internet management object as recited in claim 4, wherein the first Internet content is user-specific content.

6. The Internet management object as recited in claim 1, wherein the first user identity and the second user identity pertain to the same user.

7. Internet management object as recited in claim 1, wherein the first user identity and the second user identity pertain to a different user.

8. An Internet management object stored on a computer-readable medium, comprising computer-executable instruction that, when executed on a computer, perform the following steps:

receiving a request to switch from a first Internet context associated with a first identity to a second Internet context associated with a second identity;

storing the first Internet context in one or more containers associated with the first identity;

setting one or more global pointers to reference the second Internet context located in one or more containers associated with the second identity without requiring open processes associated with the first identity to shut down;

determining if the second identity has been utilized previously; and if the second identity has not been utilized previously, creating a new Internet context and setting one or more global pointers to reference the new Internet context stored in new containers and associated the new Internet context with the second identity.

* * * * *